Nov. 25, 1930.                C. B. GRAY                1,782,420
                            CUTTING MACHINE
                        Filed April 13, 1927        3 Sheets-Sheet 2
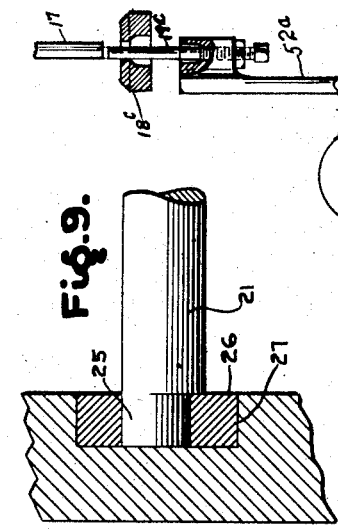
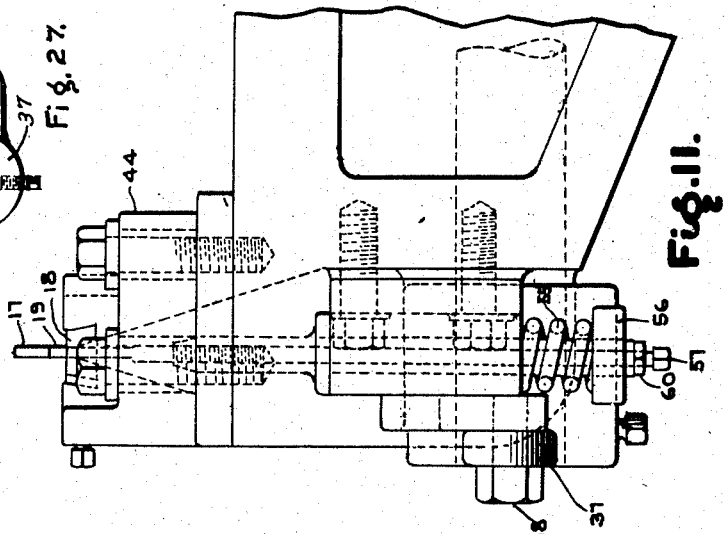
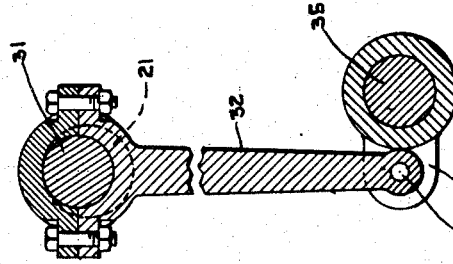
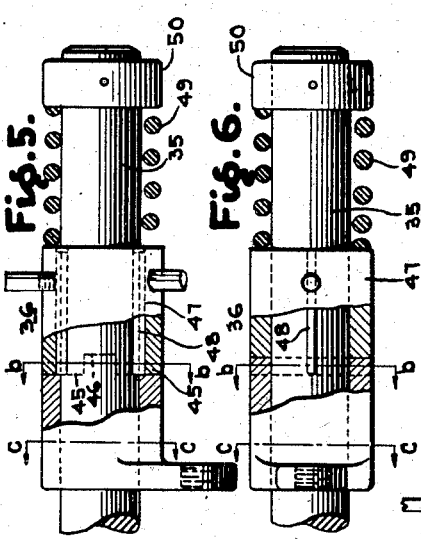
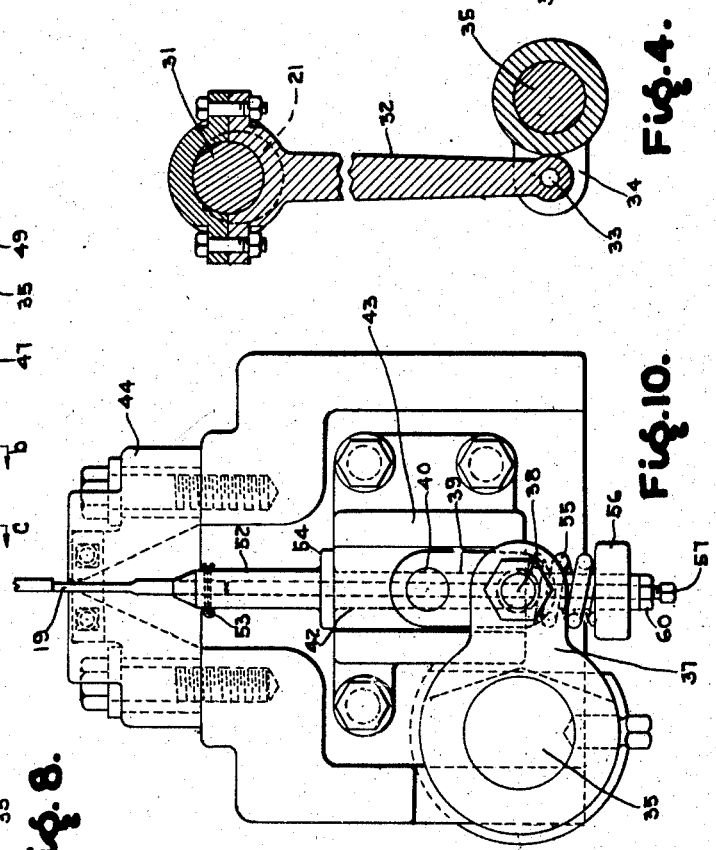
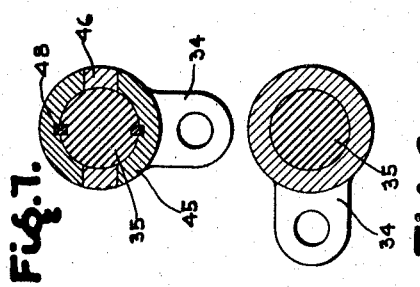
Inventor
Charles B. Gray

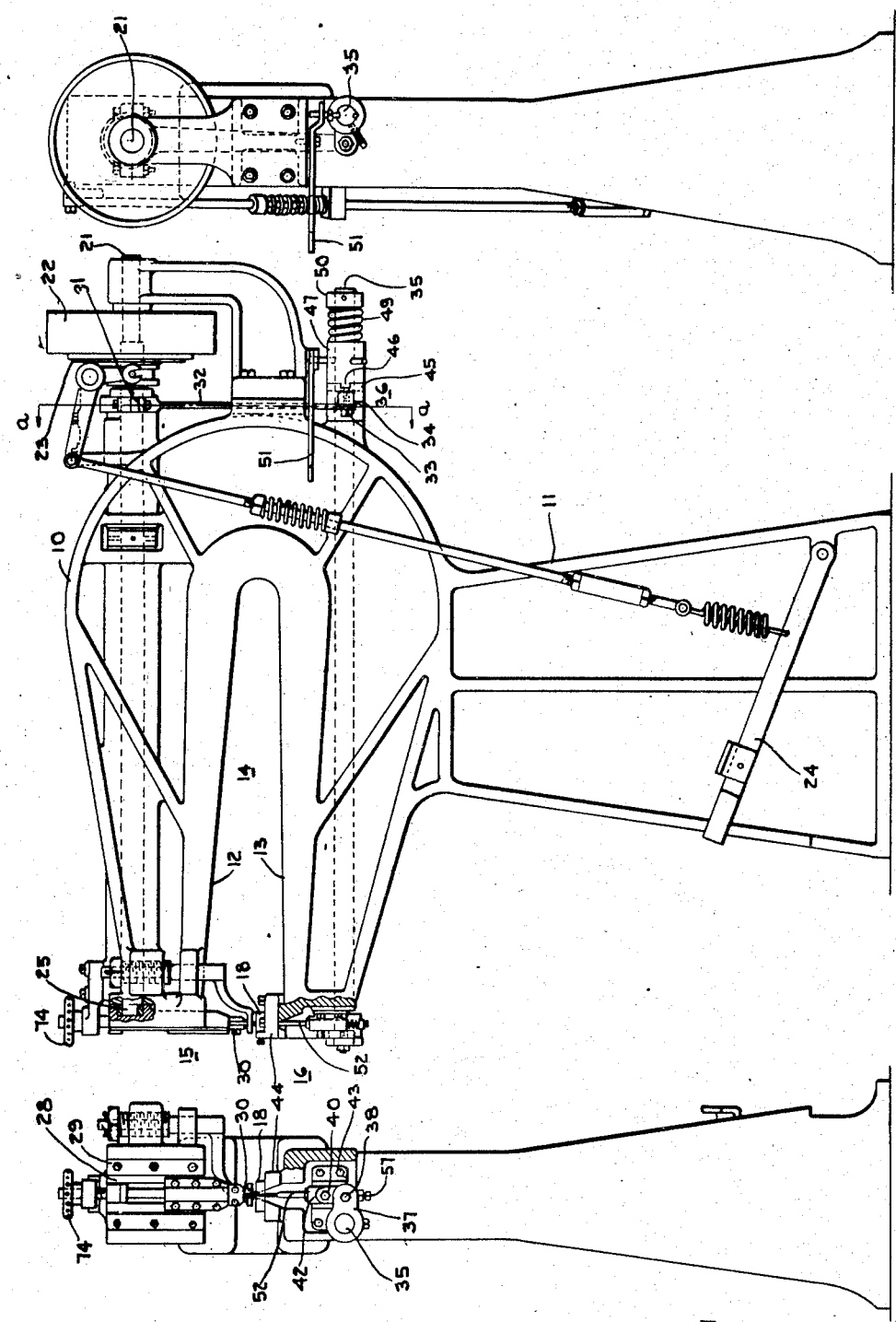

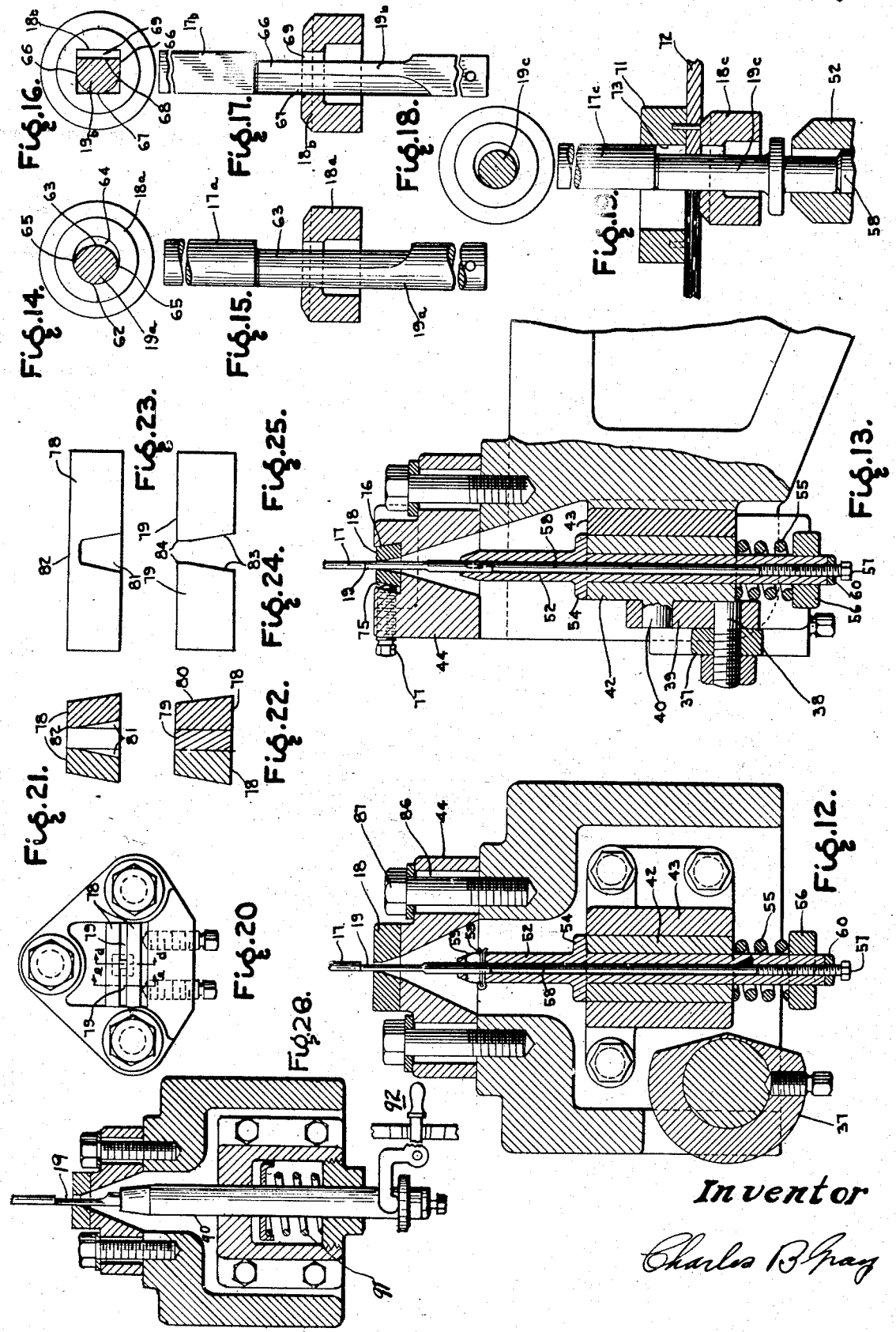

Patented Nov. 25, 1930

1,782,420

UNITED STATES PATENT OFFICE

CHARLES BAXTER GRAY, OF MILLBOURNE, PENNSYLVANIA

CUTTING MACHINE

Application filed April 13, 1927. Serial No. 183,503.

My invention relates to cutting or slotting machines for plate or sheet material, or sheet formed material, and it has for an object to provide apparatus of this character which is economical from the standpoints of manufacture and use and which is capable of cutting very narrow slots and curves of small radii and of being very readily manipulated.

Machines of the class referred to have been built consisting essentially of a punch and die wherein the punch is provided with a central or coaxial position or feed limiting member, pin or stud. In operation, when the punch clears the stock, the latter may be advanced until it contacts with the feed limiting member or pin to be in position for the next cutting stroke of the punch. In this way, the punch may be continuously operated to make successive shearing or cutting strokes, the material being advanced alternately with the cutting strokes until it engages the position or feed limiting member. Apparatus of this character has been expensive from the point of view of maintenance, more or less limited as to the minimum width of slot cut, and limited as to adaptability of operation. Therefore, my invention has for an object to provide apparatus wherein the punch and the feed limiting member do not constitute a unitary aggregate, as heretofore, but wherein these parts are separate and work together in opposed or end-to-end relation, or such relative relation as to have a portion of the feed limiting member or cutting tool in such position as to limit forward travel of material being cut, with the result that, for a feed pin or limiting member of a given size, the punch may be made relatively much smaller, as the necessary feed distance may be provided by an eccentric relation of the feed limiting member and the punch. My feed limiting member or pin is almost as large as the punch: if the feed limiting member or pin and the punch are circular, it is of sufficiently less diameter than the punch to provide the desired feed distance; and, in other cases, the feed pin and punch may have substantially the same dimension transverse of the slot, in which case, the feed pin may serve as a guide for the material, thereby making it possible to cut along any desired line without wabbling or zig-zagging. Since the punch and feed pin are separate but operate together, the feed pin following the punch, these parts may be readily dressed or sharpened.

A further object of my invention, therefore, is to provide a machine of the character described with a punch and feed pin related as set forth so that these parts may be made of material of suitable length and capable of being resharpened or dressed merely by grinding the ends thereof.

A further object of my invention is to provide apparatus of the character described wherein the feed pin serves as a guide for stock.

A further object of my invention is to provide a slot or kerf cutting machine which may be readily used with a templet.

A further object of my invention is to provide an improved form of die, particularly of the oblong or square type, which consists of a plurality of parts permitting of ready and accurate refinishing or dressing.

These and other objects are effected by my invention as will be apparent from the following description and the accompanying drawings, forming a part of this application, in which:

Fig. 1 is a side elevation of my improved shear-type cutting or slotting machine with parts thereof shown in section;

Fig. 2 is a front elevation of the apparatus shown in Fig. 1 with parts in section to show the feed pin and its operating mechanism more clearly.

Fig. 3 is a rear elevation of the apparatus shown in Fig. 1;

Fig. 4 is a sectional detail view of means for transmitting motion from the drive shaft to the feed limiting member actuating mechanism;

Figs. 5, 6, 7 and 8 are detail views, showing clutch mechanism for connecting and disconnecting the feed limiting member operating mechanism to permit operation of the machine as a punch or to permit insertion or removal of material when making inside cuts, Figs. 7 and 8 being sectional views taken along the lines *a—a* and *b—b* of Figs. 5 and 6;

Fig. 9 is a detail view showing part of the punch operating means;

Figs. 10, 11, 12, and 13 are detail views showing the die and feed limiting member and operating mechanism for the latter;

Figs. 14 and 15 are detail views showing a round punch and one form of feed limiting member;

Figs. 16 and 17 are detail views showing a square punch and a cooperating feed limiting member;

Figs. 18 and 19 are detail views showing a punch and a floating type of feed limiting member;

Fig. 20 is a plan view of a die block with die parts therein;

Figs. 21 and 22 are sectional views taken along the lines *c—c* and *d—d*, respectively, of Fig. 20;

Figs. 23, 24, and 25 are detail views of die parts; and

Figs. 26 and 27 are views showing modified forms of my invention.

Referring to the drawings more in detail, I show a shear-type frame 10 supported by a pedestal 11, the frame having upper and lower jaws 12 and 13, respectively, defining the throat 14. Power is applied in any suitable way to the machine to operate a punch mechanism, at 15, and a feed limiting member mechanism, at 16.

The machine is adapted to slot or kerf any suitable sheet or formed material by step-by-step action of a cooperating punch 17, forming a part of the mechanism, at 15, and a die 18 carried, respectively, by the upper and lower jaws 12 and 13. A feed limiting member or pin 19, constituting a part of the mechanism, at 15, is arranged in end-to-end or opposed relation with respect to the punch 17 and it serves to determine the extent of feed of stock for each cutting stroke of the punch. Assuming a sheet of material has been initially punched, when the punch 17 clears the sheet, the latter may be advanced to the extent determined by the degree to which the feed side of the punch 17 overlaps the feed limiting member or pin 19. In other words, the punch and the feed limiting member or pin reciprocate together and the stock is urged against the feed limiting member or pin as soon as it is cleared by the punch on the up-stroke of the latter; and, on the next down stroke of the punch, material is removed to the extent of the preceding feed motion thereof. The upper end of the feed limiting member may practically contact with the lower end of the punch or these parts may be spaced apart a distance not exceeding the thickness of material being cut.

While it is old to provide a feed or position member to limit the feed motion of material when cleared by a punch, yet it has been the practice to have the feed or position member carried by or unitary with the punch; and, as it has been necessary to provide a cutting edge surrounding the feed limiting portion, the latter has not only been made relatively small with respect to the punch to permit advance of stock in any direction but the position thereof has limited the feed stroke. With my arrangement of having the punch and the feed limiting member or pin in opposed, approaching, end-to-end, or abutting relation, the feed limiting member or pin may be made of a size comparable to that of the punch, particularly in a direction transverse of the slot being cut, the only requirement being that the feed limiting member or pin shall not extend beyond the punch boundary, that it shall be relieved or cut away sufficiently at the front or feed side so that the punch may overlap to an extent suitable to the desired feed motion of material, and that the distance between the opposed ends of the punch and the feed limiting member shall be less than the thickness of material being cut. With my arrangement of punch and feed limiting member, the opposed ends are mere plane surfaces, so that, in case either becomes dulled, worn, or spalled, it may be removed and dressed or sharpened simply by grinding back. Also, as the feed limiting member or pin may have a width comparable to that of the slot being cut, it will be apparent that it may serve as a guide for material, thereby permitting of the use of the machine to follow an outline, without side play, wabbling or zigzagging.

When the feed limiting member is arranged to engage the forward end of a slot at more than one edge or point, it will be apparent that the engaging edges tend to stabilize or prevent lateral shifting of the blank with respect to the instantaneous direction of feed. In this way, it is possible to cut a slot along a desired line and with substantially smooth or parallel walls. To provide for an increment or feed, it is necessary that the punch shall overhang the feed limiting member at the feed side; and this may conveniently be done by suitably relieving the feed limiting member at the feed side. Preferably, this relief of the feed limiting member is provided in such a way as to leave a pair of spaced edges for engagement with the forward end of the slot being cut. It will be obvious that these edges will be effective even though the spacing thereof may vary considerably. With a feed limiting member engaging the forward concave end of a slot at a single point or line of tangency and the blank slotted, there is nothing to resist lateral shifting of the blank with respect to such member or the instantaneous direction of feed. On the other hand, with a feed limiting member poviding a pair of spaced edges, such edges cooperate with the forward concave end of the slot to secure a wedging effect tending to centralize the blank with respect to the instantaneous direction of feed and effectively preventing side play of the blank. In some cases, it may be desirable to use a feed limiting member which has a transverse dimension substantially equal to that of the slot being cut.

Referring now to the means for operating the punch 17 and the feed limiting member or pin 19 so that these parts may reciprocate in like directions and in opposed relation, in Fig. 1, I show by way of example, a drive shaft 21 driven by any suitable means, as by a pulley 22 connected thereto by clutch 23, which is released by shifter means including an operating element or treadle 24. The drive shaft 21 is provided with an eccentric portion 25 (Figs. 1 and 9) fitting a shoe 26 movable in a transverse slot 27 provided in the slide 28 fitting guides 29, the slide being provided with a holder 30 for the punch. Hence, with rotation of the drive shaft 21, the punch 17 is reciprocated.

The feed limiting member or pin 19 is preferably positively driven so as to move with the punch 17. By way of example, I show connectable and disconnectable transmission mechanism for driving the feed limiting member or pin 19 and operated by the drive shaft 21. As may be seen from Figs. 1, 3 and 4, the drive shaft 21 is provided with an eccentric 31 connected by a link 32 pivotally connected at 33 to the crank member 34, the latter being connected to the rock shaft 35 through a clutch, at 36. When the clutch, at 36, is engaged and the drive shaft 21 is rotating, the rock shaft 35 oscillates angularly.

Upon reference to Figs. 4 and 9, it will be seen that the eccentrics 31 and 25 provided on the power shaft 21 are of the same size and have the same degree of eccentricity. Due to this, each eccentric offers the same resistance and, therefore, is is assured that like motions shall be imparted to the punch and to the feed limiting member. An eccentric may be developed as a wedge, the eccentricity being the height at the thick end. Considering large and small diameter eccentrics with the same throw or eccentricity, the heights will be the same; however, it will be apparent that the inclined surface or plane for the larger eccentric will be longer and, therefore, have less slope than that of the smaller eccentric. Apparently the practical matter of construction, necessary tolerances, and the less pitch for the larger eccentric are conducive to differences in slip of eccentrics of different sizes, thereby making is impossible to have the punch, which has to overcome the shear resistance, maintained in exact predetermined timed relation with respect to the feed limiting member.

Oscillatory motion of the rock shaft 35 is converted into reciprocatory motion by suitable means to reciprocate the feed limiting member or pin 19 in like directions with the punch 17, the relation of the feed limiting member with respect to the punch being such that the feeding action can be predetermined. To this end, the forward end of the rock shaft 35 has connected thereto a crank member 37 having a pivotal connection at 38 with a link 39, which may be pivotally connected at 40 to a slide 42 movable in suitable guides 43 carried by the lower jaw. In some cases, particularly where the floating type of feed limiting member shown in Fig. 19 is used, the feed limiting member may be operated directly by the crank member 37, as shown in Fig. 27, wherein the crank member 37 is directly pivoted to the holder 52ª for the feed limiting member 19.

The die 18, already referred to, is supported by a suitable die block 44 carried by the lower jaw 13 immediately above the slide 42 so as to be in position for the passage therethrough of the opposed and cooperating punch and feed limiting member.

In using the machine as a punch or in inserting and removing stock from the machine, it is necessary that the feed pin 19 shall be released or so separated from the punch 17 that, when the latter is clear of the stock, the stock may be inserted or removed without interference by the feed limiting member. To this end, I provide the clutch, at 36, already referred to. Any suitable form of clutch may be used so long as the parts thereof maintain the required timed relation of the drive shaft 21 and of the rock shaft 35 necessary for operation of the punch and of the feed limiting member in proper relative positions. I show the crank member 34 freely mounted on the rock shaft 35 and provided with jaw teeth 45 for engagement with jaw teeth 46 on the disengageable member 47 connected by splines 48 to the rock shaft 35. A spring 49 is arranged between the member 47 and a collar 50 on the rock shaft 35 to maintain the clutch teeth in engagement. The clutch member 51 may be shifted at any time so as to disconnect the rock shaft 35, thereby rendering the feed limiting member or pin 19 ineffective and permitting of separation thereof from the punch 17, as when punching or inserting and removing stock.

With a machine of the present type, the throat 14 may not be sufficient to accommodate stock in certain positions for cutting or slotting. Hence, I provide means for rotary adjustment of the feed limiting member or pin 19, whereby the direction of feed may be changed. To this end, I show the feed limiting member 19 carried by the holder 52, which may be turned, so that, with the feed limiting member connected to the holder, as by a key 53, the feed limiting member may be turned relatively to the punch with the feed side of the feed limiting member in a new position. As shown, the holder 52 takes the form of a tubular member or sleeve fitting an opening in the slide 42 with a flange 54 abutting the upper end of the slide and with tension means 55 arranged between the lower end of the slide and a collar 56 carried by the holder sleeve 52 to resist free turning of the latter relatively to the slide.

In order to maintain the feed limiting member or pin 19 in proper relation with the punch 17, I show an adjusting screw 57 at the lower end of the holder sleeve 52, the screw preferably engaging a distance piece 58 (Figs. 12 and 13), which abuts the lower end of the feed pin 19. Where the feed pin is non-rotarily connected to the holder sleeve 52, as shown in Figs. 10, 12 and 13, the connection is arranged to permit longitudinal motion of the feed pin relative to the sleeve. For example, I show slots 59 cooperating with the key for this purpose. After adjustment of the screw 57, the latter may be locked in position by a jam nut 60.

As hereinbefore pointed out, the feed pin 19 may have a width substantially equal to the diameter of the punch and to the width of slot being cut. Also, as shown by the drawings the back of the punch 17, of the feed pin 19, and of the die 18 may be so arranged relatively that a common tangent plane touches curved surfaces thereof.

In Figs. 14 and 15, I show a feed pin 19ª whose back 62 (Fig. 14) registers with the punch and fits the die 18ª for nearly 180°. The front or feed side of the feed pin is relieved as indicated at 63 leaving a space 64 by which the punch 17ª overlaps the feed pin. Stock is advanced at each step as determined by the overlap space 64. Since the maximum dimension of the upper portion of the feed pin 19ª is but very little less than the diameter of the punch 17ª or of the opening of the die 18ª, the regions 65 of the pin serve to guide the work so that a desired line may be followed by giving to the work suitable feed motion, either translatory or combined rotary and translatory, it being understood that the work may be turned to the extent that successive punchings produce slot sides which may slide past the feed pin. Should a sharp turn or bend be reached or should the shape of the blank be such that it cannot be accommodated in the throat space 14 for a given direction of feed, the feed limiting member 19ª may be turned so that the outline may be followed.

In Figs. 16 and 17, I show a punch 17ᵇ, die 18ᵇ and feed limiting member 19ᵇ suitable for cutting straight or curved slots or slots at right angles to each other. In these views, the punch is rectangular, the die has a rectangular opening, and the feed limiting member 19ᵇ registers at its sides 66 and at its back 67 with lateral and back faces of the punch and of the die while the front face 68 of the feed limiting member is overlapped by the punch to the extent indicated by the rectangular space 69 between the front face 68 of the pin and the front edge of the die 18ᵇ. The feed limiting member is preferably relieved between the lateral guide faces 66 and the medial point 67 at the back to facilitate passage of slot sides thereby. With each stroke of the punch, a portion of the sheet corresponding to the rectangular area 69 is cut out; and, when it is desired to make a 90 degree change in direction, the feed limiting member is turned 90 degrees and the stock is fed normally with respect to the front face 68 of the feed limiting member. It will be evident that the stock may be turned as desired by the operator and as permitted by the guide sides 66 of the feed limiting member, while it is given a translatory feeding motion.

In Fig. 14, the lateral guide edges or portions 65 cooperate with the forward concave end of the slot being cut to prevent side play of the blank being cut with respect to the direction of feed. Such a feed limiting member, therefore, makes it possible to follow a desired line without a templet. This feature of construction may be embodied in various ways, the only requirement being that the portion of the apparatus which limits the increment of feed shall have a pair of spaced edges or portions capable of cooperating with a slot in the manner set forth. Should the forward end of the slot be not concave, as is the case with the form of apparatus shown in Fig. 16, the feed limiting member may be provided with spaced guide portions, for example, 66 in Fig. 16, for cooperation with sides of a slot being cut to prevent side play of the blank; and, such feed limiting member may be relieved to permit turning of the blank to follow a curved path or to permit cutting a slot with an angle portion.

In Fig. 19, I show a further modified form, wherein the feed member 19ᶜ is circular in cross section and smaller in diameter than the circular punch 17ᶜ and the circular opening in the die 18ᶜ. The lower end of the member 19ᶜ fits loosely in the socket of the holding member 52, that is, it is floatingly mounted between the punch 17ᶜ and the distance piece 58. In operation, the feed pin 19ᶜ serves to limit the feed motion; however, due to the floating mounting, it is free to take different positions at the back of the punch and the die, referred to the instantaneous direction of feed, due to feed pressure applied to the stock and from the latter to the pin. The feed pin tends to assume such a position, for a given direction of feed, as to permit the maximum amount of stock being overlapped. This form is particularly useful in following irregularly curved outlines.

In connection with the modified form shown in Fig. 19, I prefer to use a templet 71 which extends above the cutting face of the punch 17ᶜ, the templet being secured in any suitable way to the stock 72. In operation, the stock is fed so that a templet side, for example, 73, is maintained against the punch whereby the latter punches a slot, one side of which registers with the punch-engaging templet side. The floating feed pin 19ᶜ takes up such positions as to permit the stock being fed intermittently underneath the punch, any instantaneous position of the feed pin being determined by the instantaneous feed direction, the pin tending to be placed in position to permit the maximum feed increment.

In order that the punch may be raised above its normal upper position, I provide means including a hand wheel 74 (Figs. 1 and 2), in connection with the punch slide for elevating the punch relatively to the slide. This is necessary in order to place the punch inside of the templet.

It will be understood that, with a machine such as already described, the punches, dies and feed pins may be readily changed either or both in respect to size and type. The holder sleeve 52 is capable of readily accommodating a floating feed pin as shown in Fig. 19. In this connection, as already pointed out, a punch of relatively small size may be used as no portion of the cutting face thereof has to be devoted to the provision of a feed pin or projection. Owing to the fact that plane faced punches and feed pins are used, these parts may be of suitable length to be redressed or sharpened; and, as this may be readily done by simply grinding down the ends, the arrangement is economical from the standpoints of maintenance and of operation.

In addition to the advantage of ready dressing or sharpening, where the feed pins approximate the slot width, no templet is necessary and an outline may be readily followed. In this way, a templet may be produced on the machine to be used with the floating type feed pin in securing rapid production.

Figs. 12 and 13 show more in detail the means for holding a die, the latter views showing a die block having a recess 75 with opposed upwardly converging walls 76. The die has downwardly diverging sides so that the clamping screws 77 tend to hold the die seated in the recess.

Where the die has a square opening, I prefer to make it in four parts, as shown in Figs. 20, 21, 22, 23, 24 and 25, the parts including front and back parts 78 and intervening parts 79, the front and back parts having outer inclined faces 80 and adjacent vertical faces which fit lateral faces of the intermediate pieces 79. The front and back pieces 78 are relieved intermediately of opposed faces, as indicated at 81, to provide for upper die cutting edges 82. Opposed ends of the pieces 79 are relieved at 83 to provide upper die cutting edges 84. Assuming that the parts are assembled, with the cutting edges 82 and 84 defining a rectangular die opening, the assembly is clamped in position with respect to the die block 44 by the screws 77. The multiple part construction has the advantage that the parts thereof may be readily reground to provide sharp cutting edges.

After a die is secured in place with respect to the block or holder, it is necessary that the cutting edges shall be properly related to the punch. Hence, the block is provided with openings 86 which are relatively larger than the hold-down screws 87, whereby the block may be shifted to proper position and then clamped with respect to the lower jaw 13.

While I prefer to drive the feed pin 19 positively, as shown in Figs. 1, 2, and 3, yet the construction may be simplified, as shown in Fig. 26, where the feed pin is carried by a spring supported feed pin holder wherein the spring serves to maintain the punch and the feed pin in end-to-end and abutting relation. In this view, I show a holder or slide 90 carrying the feed pin 19, the slide having a spring 91 associated therewith to urge the feed pin in contact with the punch. Means is shown, at 92, for depressing the slide for the feed pin when inserting or removing sheets. While this form is subject to the objection that, where certain materials, such as metals, are cut, chips may become lodged or wedged between the punch and the feed limiting member, thereby interfering with operation of the machine, yet, with certain kinds of materials this objection would not occur.

In general, the operation of the machine is as follows: Before inserting a sheet, the feed limiting member is released by disengaging the clutch, at 36. The sheet is then inserted and the starting opening is punched if that is necessary. If a slot is to begin at an edge, the release of the feed limiting member is unnecessary. If a templet is used, it may be necessary to raise the punch thereover. If a starting opening is punched or if the punch is brought to position in an interior opening in a sheet, the clutch, at 36, is re-engaged and the feed limiting member 19 is brought back into proper operating relation with respect to the punch 17. The machine may now be operated to produce a slot or kerf by alternately punching and feeding the sheet as determined by the extent of overlap of the punch with respect to the feed limiting member. To remove work, if the punch is surrounded by such work, the punch is elevated above the work and the clutch, at 36, is disconnected. Various types and sizes of punches and feed limiting member may be used with the machine.

From the foregoing, it will be apparent that I have provided a punching machine of the nibbling type for cutting shapes in sheet material, or sheet formed material, which is characterized by a punch and feed limiting member disposed in end-to-end or opposed relation and operating together, this construction having the following advantages:

1. The punch cutting face may be readily resharpened since it is plane faced and not modified to provide for the feed or position member. Since the feed limiting member has a plane face, it may be readily redressed. Due to the facility with which the opposed faces may be redressed or resharpened, my arrangement is economical, for punches and feed pins of suitable lengths may be provided and used until they are shortened to the limits.

2. Since the punch is independent structurally from the feed pin, a very small punch may be used and consequently very narrow slots may be cut, the only requirement being that the feed pin shall be sufficiently smaller in the direction of feed to permit feeding.

3. The structural independence of the punch and of the feed pin permits of the employment of a feed pin relieved at the front and approximately as wide as the slot, whereby a smooth sided slot may be cut without the use of a templet. Hence a design may be cut in sheet from a traced outline or templets may be produced.

4. Where the floating feed pin, smaller in diameter than the punch, is used, a curved or irregular shape may be readily cut and this may be done quite expeditiously and accurately when a templet is used.

It will also be seen that I have provided a die construction which is peculiarly suitable for the machine.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus of the character described, the combination of a cooperating punch and die, a feed limiting member disposed in opposed relation with respect to the punch, mechanism for reciprocating the punch, and mechanism driven by the first mechanism and including a clutch for moving the feed limiting member in like directions simultaneously with and substantially to the same extent as the punch.

2. In apparatus of the character described, the combination of a cooperating punch and die, a feed limiting member disposed in opposed relation with respect to the punch, means for reciprocating both the punch and the feed limiting member positively together in both directions, and means providing for manual rotary adjustment of the feed limiting member with respect to the punch in accordance with the desired direction of feed.

3. In apparatus of the character described, the combination of a frame having upper and lower jaws with a throat space therebetween, a punch carried by the upper jaw and cooperating with a die carried by the lower jaw, a feed limiting member carried by the lower jaw and cooperating with the punch when the latter is in its uppermost position for limiting the feed of material, means for adjusting the feed limiting member in accordance with a desired direction of feed, and mechanism for operating the punch and the feed limiting member.

4. In apparatus of the character described, the combination of a die, a reciprocatory slide disposed at one side of the die, a punch carried by the slide for cooperation with the die, a reciprocatory slide disposed at the other side of the die, an angularly adjustable holder carried by the second slide, a feed limiting member carried by the holder and arranged to extend through and beyond the die on the back stroke of the punch, and means for moving the slides.

5. In apparatus of the character described, the combination of a die, a reciprocatory slide disposed above the die, a punch carried by the slide for cooperation with the die, a socket member disposed below the die, a feed limiting member carried by the socket member and having its upper end disposed adjacent to the lower end of the punch, means providing for adjustment of the socket member angularly with respect to its axis, means for adjusting the feed limiting member longitudinally with respect to the socket member, mechanism for reciprocating the slide, and mechanism including a clutch operated by the first mechanism for moving the socket member so that the feed limiting member may move upwardly through and above the top surface of the die on the up stroke of the punch.

6. In apparatus of the character described, the combination of a cooperating punch and die, a feed limiting member disposed in opposed relation with respect to the punch, a power shaft having a pair of eccentrics thereon of the same diameter and eccentricity, means operated by one of the eccentrics for reciprocating the punch, and means operated by the other eccentric for reciprocating the feed limiting member simultaneously in like directions with the punch and to the same extent as the latter and including clutch mechanism, whereby the feed limiting member may be connected and disconnected with respect to the power shaft.

7. In apparatus of the character described, the combination of a frame providing a pair of spaced jaws, substantially parallel shafts carried by the jaws, opposed slides mounted on the jaws, a punch carried by one slide, a feed limiting member carried by the other slide, the cutting end of the punch being arranged contiguously to one end of the feed limiting member, means for imparting angular movements to said shafts with respect to their longitudinal axes, and transmission means between the shafts and the slides and arranged to convert angular motion of the shafts into reciprocatory motion of the slides.

8. In apparatus of the character described, the combination of a frame having spaced upper and lower jaws, a punch carried by the upper jaw, a die carried by the lower jaw for co-operation with the punch, a feed limiting member carried by the lower jaw and having its upper end disposed contiguously to the lower end of the punch, a power shaft carried by the upper jaw, means operated by the power shaft for reciprocating the punch, a rock shaft carried by the lower jaw, means operated by the power shaft for oscillating the rock shaft, and means operated by the rock shaft for reciprocating the feed limiting member simultaneously and in like directions with respect to the punch.

9. In apparatus of the character described, the combination of a frame having spaced upper and lower jaws, a punch carried by the upper jaw, a die carried by the lower jaw for co-operation with the punch, a feed limiting member carried by the lower jaw and having its upper end disposed contiguously to the lower end of the punch, a power shaft carried by the upper jaw, means operated by the power shaft for reciprocating the punch, a rock shaft carried by the lower jaw, an eccentric on the power shaft, a crank arm on the rock shaft, a connecting rod for connecting the eccentric to the crank arm, and means operated by the rock shaft for reciprocating the feed limiting member.

10. In apparatus of the character described, the combination of a frame having spaced upper and lower jaws, a punch carried by the upper jaw, a die mounted on the lower jaw for cooperation with the punch, a feed limiting member carried by the lower jaw and having its upper end disposed contiguously to the lower end of the punch, a power shaft carried by the upper jaw, means operated by the power shaft for reciprocating the punch, a rock shaft carried by the lower jaw, a crank arm on the rock shaft, a clutch for connecting and disconnecting the crank arm with respect to the rock shaft, an eccentric on the power shaft, a connecting rod for transmitting motion from the power shaft to the crank arm to oscillate the rock shaft, and means operated by the rock shaft for reciprocating the feed limiting member.

11. In a machine of the character described, the combination of a reciprocatory punch, a feed limiting member cooperating with the punch, a holder having a recess with the end of the feed limiting member remote from the punch arranged therein, means arranged in the recess and abutting the end of the feed limiting member remote from the punch, and means providing for longitudinal adjustment of the last-named means to adjust the feed limiting member with respect to the punch.

12. In a machine of the character described, the combination of a punch, feed limiting means for the punch, a rectilinear guide for the feed limiting means, means providing for reciprocation of the feed limiting means simultaneously and in like directions with respect to the punch, and means providing for the adjustment of the feed limiting means angularly with respect to the longitudinal axis of said guide.

13. In a machine of the character described, the combination of a punch, a feed limiting member cooperating with the punch, a guide extending in the same direction as the punch, a slide fitting the guide and having a cylindrical opening, a holder for the lower end of the feed limiting member and having a cylindrical portion fitting said cylindrical opening, and means for resisting turning of the holder with respect to the slide.

14. In a machine of the character described, the combination of a punch, a feed limiting member cooperating with the punch, a guide extending in the same direction as the punch, a slide fitting the guide and having a cylindrical opening, a holder for the lower end of the feed limiting member and having a cylindrical portion fitting said cylindrical opening, means providing for adjusting the feed limiting member longitudinally with respect to the holder, and means for resisting turning of the holder with respect to the slide.

15. In a machine of the character described, the combination of a cooperating punch and die, a feed limiting member cooperating with the punch and having lateral guide edges, the punch overhanging the feed limiting member in front of said guide edges, mechanism for reciprocating both the punch and the feed limiting member, and means providing for turning of the feed limiting member, whereby a change in direction of cutting of work may occur without turning the work.

In testimony whereof, I have hereunto subscribed my name this twelfth day of April, 1927.

CHARLES BAXTER GRAY.